Aug. 7, 1945.  A. O. RYAN  2,381,003
INSULATED ELECTRIC CONDUCTOR
Filed Nov. 5, 1942

INVENTOR.
ALBERT O. RYAN
BY
ATTORNEY

Patented Aug. 7, 1945

2,381,003

UNITED STATES PATENT OFFICE 2,381,003

INSULATED ELECTRIC CONDUCTOR

Albert Olen Ryan, River Edge, N. J., assignor to Federal Telephone & Radio Corporation, New York, N. Y., a corporation of Delaware Application November 5, 1942, Serial No. 464,633

5 Claims. (Cl. 174—29)

This invention relates to insulated electric conductor and more particularly to electrical lines of the concentric conductor type.

The object is to provide an insulation covering around a conductor containing a substantial proportion of air to solid and over which a sheathing such as an outer conductor may be directly applied. A related object is to provide an insulation containing air which will support without deformation or sagging an outer sheathing or conductor which is not self-supporting.

It is well known that air is often a highly desirable insulation or dielectric around an electrical conductor and between the central and outer conductors of a concentric line. To use air around a central conductor it is required to space the outer sheathing or conductor by some solid spacing means; and it is desired to provide as high as practical a ratio of air to solid. Many expedients have been proposed for doing this, such as wrapping cords in loose helices around the central conductor, placing insulating beads of glass or the like over the conductor; and similar expedients. It has not heretofore been practical to place an outer conductor such as a braided metal sheathing directly over such insulating spacers, as they do not provide a continuous smooth supporting surface for a conductor such as a copper braid, which is not self-supporting and would tend to sag at the irregularities. Such sagging is highly undesirable in a concentric line, as it alters the electrical characteristics. It has accordingly heretofore been the practice to place a rigid self-supporting sheath such as a rigid insulating tubing over the spacing element and to use the outer smooth surface of such insulating tube as a support for the metal braid or conductor. The use of such an auxiliary insulating tubing adds to the proportion of solid to air and also adds to the expense of the line.

In accordance with my invention I am enabled to eliminate the requirement for the auxiliary insulating sheath and thereby increase the ratio of air to solid and reduce the expense of the line, providing a supporting base which will not allow the outer conductor to sag.

The invention is carried out by wrapping an air filled tubing around the central conductor and placing the outer sheathing or conductor tightly over the tubing to hold the tubing in a substantially or nearly rectangular or square cross section. The invention will be more fully understood from the following detailed description considered in connection with the drawing of which;

Fig. 1a is a cross section taken at line 1a—1a of Fig. 1;

Fig. 2a shows a cross sectional view taken at line 2a—2a of Fig. 2.

Figure 1:
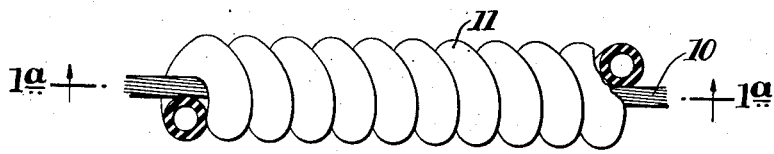
Fig. 1 illustrates a conductor having an air filled tubing of insulation wrapped around it.
Figure 1:
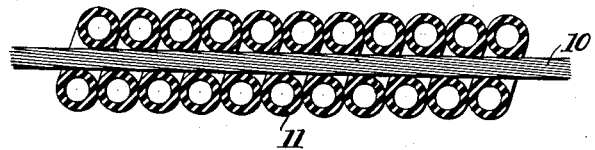

Fig. 1 shows a conductor 10, which may be stranded or a solid wire with a wrapping of an air-filled insulating tubing 11. The tubing is hollow as shown in Fig. 1a and preferably cylindrical as shown, and it is wound in a helix around the conductor in a close lay so that adjacent turns touch each other. If it is desired to increase the pitch of the helix, two or three or more of the tubes may be wound together, side by side. Regardless of the number of tubes or helices used, the adjacent tubes, should be made substantially to touch each other; and this is what is meant by the term "close lay" as used in this specification.

Figure 2:
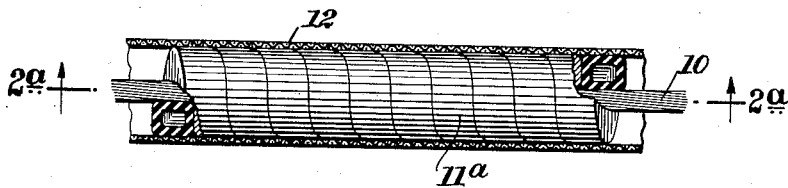
Fig. 2 shows the conductor of Fig. 1 with an outer conductor sheathing tightly wrapped around it, the other sheathing being shown in cross section.
Figure 2:
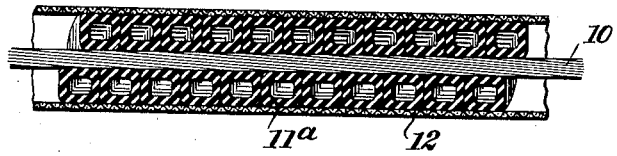

There is wrapped over the tubular lay 11, an outer sheathing 12 (Figs. 2 and 2a). This is ordinarily and preferably an outer conductor although it could be, if desired, an insulation tubing. The greatest advantage of the invention would ordinarily be obtained, however, when it is a conductor, forming with the inner conductor 10 a concentric line. The outer conductor 12, should be wrapped around the insulation 11, with sufficient tension to flatten down the cross section of the tubular wrapping to a generally square or rectangular cross section as shown at 11a in Figs. 2 and 2a, this being the shape which will be had due to the fact that the adjacent turns touch or substantially touch each other. This may be done by the application of the proper tension by a braiding machine in a well known manner, by which a braid of copper or other suitable conducting material may be applied. By reason of the cross section shown in Figs. 2 and 2a, adjacent walls of adjacent turns contact each other over all or nearly all of their adjacent areas, and likewise they present an outer peripheral surface which is substantially flat along the length of the conductor so that this outer surface is useful as a rigid support for the outer conductor and holds the outer conductor at a definite uniform distance from the inner conductor. This definite and uniform spacing between the inner and outer conductors is of prime importance in a concentric line as the electrical characteristics of the line are affected by the spacing. In the absence of the peripheral supporting surface uniformly spaced from the central conductor, the metal braid sheathing, not being self-supporting, would sag in places, with consequent deleterious results.

The material of the tube or tubes 11 should be an insulating material having a reasonably high degree of flexibility and a low dielectric constant and preferably low power factor. It should preferably be sufficiently yielding and elastic to assume the substantially square or rectangular cross section and hold that shape against the pressure from the outer conductor. The greater the pitch of the winding of the tubing, as when a plurality of tubes are used side by side, the more elongated the rectangular section becomes, as taken longitudinally through cable. It will be understood that the substantially square cross section shown in Figs. 2 and 2a is in fact a rectangular cross section of which all sides are substantially equal. Polyethylene meets these requirements and is suggested as a preferred material as it has the desired electrical and insulating properties. There could also be used polystyrene plasticized with a suitable plasticizer for example, as described in the United States Letters Patent 2,272,996. Suitable plasticizers are there described as phenanthrene, isoamylnaphthalene, $\alpha$-propylnaphthalene, $\beta$-methylnaphthalene, fluorene, $\beta$-naphthylmethylether, $\beta$-naphthylethylether, octahydroanthracene, and octahydrophenanthrene. Rubber or rubber-like materials could also be used, and also mixtures of polystyrene and rubber-like materials such as polyisobutylene might also be used. Another substance which could be used for the hollow tubing is ethyl cellulose. Other suitable materials will readily suggest themselves from the foregoing. The electrical characteristics of the cable will depend on the particular material used for the tubes and also on the ratio of solid to air in the dielectric. The particular choice of these factors will depend on the requirements of each case. The dielectric constant of the material should preferably be low, below about 3.

The tubing 11, should preferably be, and may need be in some cases, sealed off to seal the air within it, so that it will not collapse when the outer sheathing 12 is being applied under tension. It may be desirable in many cases to seal off the tubing at intervals.

The cross section of the tubing need not always be rectangular as illustrated in Figs. 2 and 2a, but might depart considerably from this shape, so long as the adjacent tubes are in direct contact with each other.

By the use of this invention it is possible to obtain an insulated or concentric conductor in which the insulation has a relatively high proportion of air to solid, thereby affording the advantages of an air dielectric; and the insulation at the same time is rigid and fixed enough in place to hold the outer sheathing rigidly in place and without deforming, and it furnishes a base for an outer conductor such as a braid without permitting any sagging or displacing. My cable is useful in cases where a low capacity cable is wanted, for example where high frequencies are used.

What is claimed is:

1. An insulated conductor comprising a central conductor and hollow air filled tubular insulating means wrapped around the central conductor in a close lay and a sheathing fitted tightly around the tubular lay, the turns of said tubular lay having a substantially square or rectangular cross section and lying against each other and forming a rigid support for the sheathing.

2. A concentric electrical line comprising a central conductor, an air-filled tubular deformable and flexible insulating material of normally cylindrical cross section wrapped around the conductor in a close lay and an outer conductor sheathing wrapped tightly around the lay with a tension which deforms the turns of the tubular material from the cylindrical cross section.

3. A line according to claim 2, in which the tubular means is sealed off to hold the air within it and prevent collapse.

4. A line according to claim 2 in which the sheathing is supported by the said insulating material wrapped around the conductor.

5. The method of making a concentric line which comprises wrapping a deformable air-filled hollow tubular member in a close helix around the conductor, sealing the air within the tubular member and placing an outer sheath around the tubular member under tension.

ALBERT O. RYAN.